(12) United States Patent
Futamura et al.

(10) Patent No.: US 6,682,625 B1
(45) Date of Patent: Jan. 27, 2004

(54) METHOD AND APPARATUS FOR MANUFACTURING PROFILES AND LAMINATES

(75) Inventors: Shoji Futamura, Kawasak (JP); Chikara Murata, Kawasak (JP); Isamu Aoki, Yokohama (JP)

(73) Assignees: Institute of Technology Precision Electrical Discharge Works, Kanagawa-ken (JP); Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/171,997

(22) PCT Filed: Feb. 24, 1998

(86) PCT No.: PCT/JP98/00729
§ 371 (c)(1),
(2), (4) Date: Mar. 5, 1999

(87) PCT Pub. No.: WO98/37993
PCT Pub. Date: Sep. 3, 1998

(30) Foreign Application Priority Data

Feb. 25, 1997  (JP) .............................................. 9-39618
Mar. 4, 1997   (JP) .............................................. 9-48624
Mar. 4, 1997   (JP) .............................................. 9-48625

(51) Int. Cl.[7] ............................................ B32B 31/00
(52) U.S. Cl. ....................... 156/252; 156/256; 156/264; 156/512; 156/513; 156/517; 156/528; 156/563; 29/893.33; 29/893.36; 29/564.6; 83/29
(58) Field of Search ................................ 156/252, 256, 156/264, 512, 513, 514, 517, 528, 563; 83/29; 29/893.33, 893.36, 564.6

(56) References Cited

U.S. PATENT DOCUMENTS

| 4,285,754 | A | * | 8/1981 | DiMatteo | 156/264 |
| 4,959,115 | A | * | 9/1990 | Lacy | 156/264 |
| 5,015,312 | A | * | 5/1991 | Kinzie | 156/63 |
| 5,160,682 | A | * | 11/1992 | Calfee | 264/161 |
| 5,730,817 | A | * | 3/1998 | Feygin et al. | 156/64 |
| 6,056,843 | A | * | 5/2000 | Morita et al. | 156/250 |

FOREIGN PATENT DOCUMENTS

| JP | 55-047582 | 12/1990 |
| JP | 03-044346 | 9/1991 |
| JP | 06-114467 | 4/1994 |
| JP | 08-228461 | 9/1996 |
| JP | 09-163691 | 6/1997 |
| JP | 09-234523 | 9/1997 |

\* cited by examiner

*Primary Examiner*—Mark A. Osele
(74) *Attorney, Agent, or Firm*—McGlew and Tuttle, P.C.

(57) ABSTRACT

A method for manufacturing profiles formed so as to have different cross-sectional shapes in the height direction, in which a long-sized hoop of workpiece is indexed, a plurality of types of component members having outer contours corresponding to the respective cross-sectional shapes of the profile are formed in a plurality of stages and indexed in the state where the component members are replaced on the workpiece, and the component members are sequentially ejected from the workpiece, laminated into a profile in the final stage. Clearance holes passing through component members are provided simultaneously with the blanking of the component members, a plurality of the component members are laminated and welded together by applying a laser beam, and then another component member is laminated and pressed on the previously laminated and welded component members so that the clearance holes of the component member agree with the weld buildups on the previously laminated and welded component members, and welded together with the previously laminated and welded component members by applying a laser beam onto locations other than the clearance holes on the component member.

21 Claims, 15 Drawing Sheets

(a)

(b)

METHOD AND APPARATUS FOR MANUFACTURING PROFILES AND LAMINATES

FIELD OF THE INVENTION

This invention relates generally to a method and apparatus for manufacturing a profile having different cross-sectional shapes in the axial or height direction from a laminate comprising blanked sheets, and a method and apparatus for manufacturing component members having outer contours corresponding to the cross-sectional shapes of a laminate in the axial or height direction by blanking sheet stock and sequentially laminating the component members into a profile, and more particularly to a method and apparatus for manufacturing a laminate that can be integrally laminated into a profile easily and positively.

BACKGROUND ART

FIG. 1 is a diagram of assistance in explaining a profile to which this invention is applied; (a) being a front view and (b) a plan view. FIG. 2 is cross-sectional shapes of the profile of FIG. 1, viewed from different angles; (a) to (e) being sectional views taken substantially on lines A—A, B—B, C—C, D—D and E—E, respectively, in FIG. 1(a). In FIG. 2. hatching has been omitted for simplicity.

When manufacturing a profile 100 as shown in FIG. 1 from a steel sheet material, the portion of the profile 100 having a circular cross section as shown in FIG. 2(b) and (d) can be machined by lathe turning, but the portions having square, hexagonal and pseudo-cross-shaped cross sections as shown in FIG. 2(a), (c) and (e) require extremely complex machining operations, and accordingly increased man-hours and machining cost.

DISCLOSURE OF INVENTION

It is extremely troublesome and complex to manufacture a profile as described above by machining a solid round bar or block, and machining such a profile may be even impossible in some cases. A method for dividing the profile into several component members and subjecting them to different, machining operations, an assembling the machined component members into a profile has been known. For profiles of small sizes, however, it may be impossible to assemble such component members.

To manufacture a profile having a complex shape, on the other hand, casting means, for example, have been employed. Manufacture of profiles with casting means, however, involves a large number of steps ranging from the manufacture of models, to the formation of casting molds, the pouring of molten metal into the molds and so on. This also requires a large amount of man-hours and manufacturing cost. Even by adopting a precision casting method, such as the lost-wax method, it is difficult to maintain high precision and to finish the product into a very smooth surface after casting. The surface finish of the product required after casting tends to increase the cost for manufacturing profiles.

The aforementioned profile can be manufactured by blanking sheet stock into component members having outer contours corresponding to the cross-sectional shapes of the profile in the axial or height direction, and laminating the component members into a laminate corresponding to the profile. In this case, however, laminating component members is usually carried out manually, requiring a large amount of man-hours even when the outer contours of component members are identical. This also involves increased manufacturing cost. Laminating component members having complex outer contours as shown in FIG. 1 requires much more trouble in positioning the component members. This would also increase manufacturing cost.

Means for laminating component members into a laminate include spot welding and laser welding. These welding means tend to cause locally deformed welds, or local weld buildups, leading to gaps between the component members, or reduced laminated density of the laminate, or reduced dimensional accuracy. This would result in loss of predetermined functions as a laminate in extreme cases.

This invention is intended to solve these problems inherent in the prior art. It is therefore an object of this invention to provide a method and apparatus for manufacturing a profile having different cross-sectional shapes in the height direction by laminating sheet members into a laminate. It is also an object of this invention to provide a method and apparatus for manufacturing a laminate in which a plurality of component members can be easily and positively laminated into a laminate.

To overcome the aforementioned objectives, this invention has adopted a technical means, in a method and apparatus for manufacturing a profile having different cross-sectional shapes in the height direction, where a plurality of component members having different outer contours corresponding to the cross-sectional shapes of the profile in the height direction are formed at a plurality of forming stages by indexing a long-sized hoop of workpiece in the longitudinal direction, indexing the formed component members in a state temporarily connected to the workpiece, and laminating the component members into a laminate by sequentially ejecting the component members from the workpiece in the final stage.

This invention has also adopted a technical means where the manufacturing apparatus for the aforementioned manufacturing method comprises a feeding device for indexing a workpiece, a plurality of punch/die sets for forming multiple types of component members, a push-back device for temporarily replacing the component members to the workpiece, and a laminating device for laminating the component members in the final stage; the punch/die sets and the push-back device adapted to be selectively operable.

This invention has also adopted a technical means, in a method for manufacturing a laminate by punching sheet stock into component members having different outer contours corresponding to the cross-sectional shapes of the laminate, and sequentially laminating the component members into the laminate, where a plurality of component members are blanked from sheet stock, together with clearance holes passing through the component members, part of the component members are laminated and welded together by laser welding, the remaining component members are laminated on the laser-welded component members, with the clearance holes positioned to clear weld buildups on the laser-welded component members, and the entire component members are welded together by applying a laser beam onto the areas of the component members other than the clearance holes.

This invention has also adopted a technical means where the manufacturing apparatus for the aforementioned manufacturing method comprises a housing device for housing multiple types of component members having guide holes and clearance holes, a supporting device having guide pins for engaging with the guide holes, a holding and pressing device for extracting and feeding particular component members onto the supporting device, and a laser-beam unit for applying a laser beam so that the component members are sequentially laminated and welded together into a laminate.

BEST MODE FOR CARRYING OUT THE INVENTION

Figure 1:
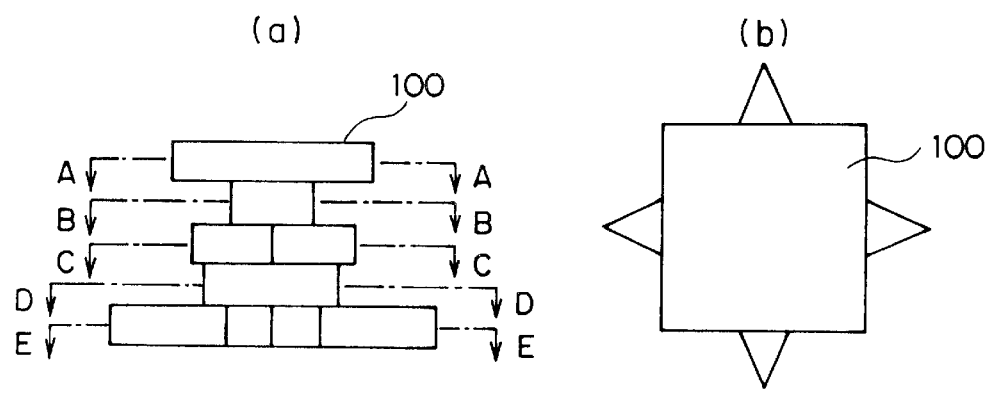
FIGS. 1(a) and (b) are diagrams of assistance in explaining a profile to which this invention is applied; (a) being a front view and (b) a plan view thereof.
Figure 2:
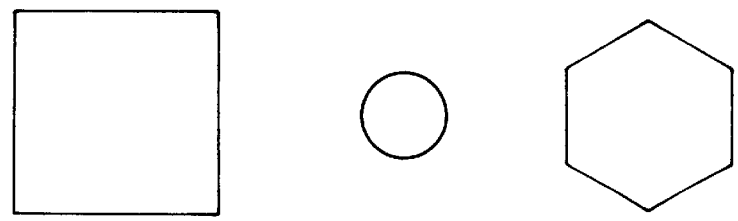
FIGS. 2(a)—(e) are cross-sectional views of the profile shown in FIG. 1(a) taken substantially on lines A—A, B—B, C—C, D—D and E—E, respectively.
Figure 2:
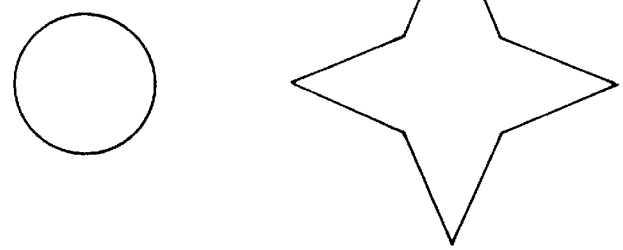

FIGS. 3(a)–(g) are diagrams of assistance in explaining a profile and component member thereof in an embodiment of this invention; (a) and (b) being front and plan views of the profile, and (c) through (g) plan views of component members comprising the profile. In FIG. 3, a profile 100 is of the same shape as that shown in FIG. 1 formed by laminating multiple pieces each (two pieces each in FIG. 3) of multiple types of component members 101~105 having different outer contours corresponding to the cross-sectional shapes of the profile 100 at each positions in the height direction.

Numeral 106 refers to a dowel hole (blind hole); a plurality of dowel holes 106 of the same shape and size are provided at identical relative positions in the center of the component members 101~105 using a means which will be described later. The component members 101~105 may be composed of either a single piece or two or more pieces, depending on the shape and size of the profile 100.

Figure 3:
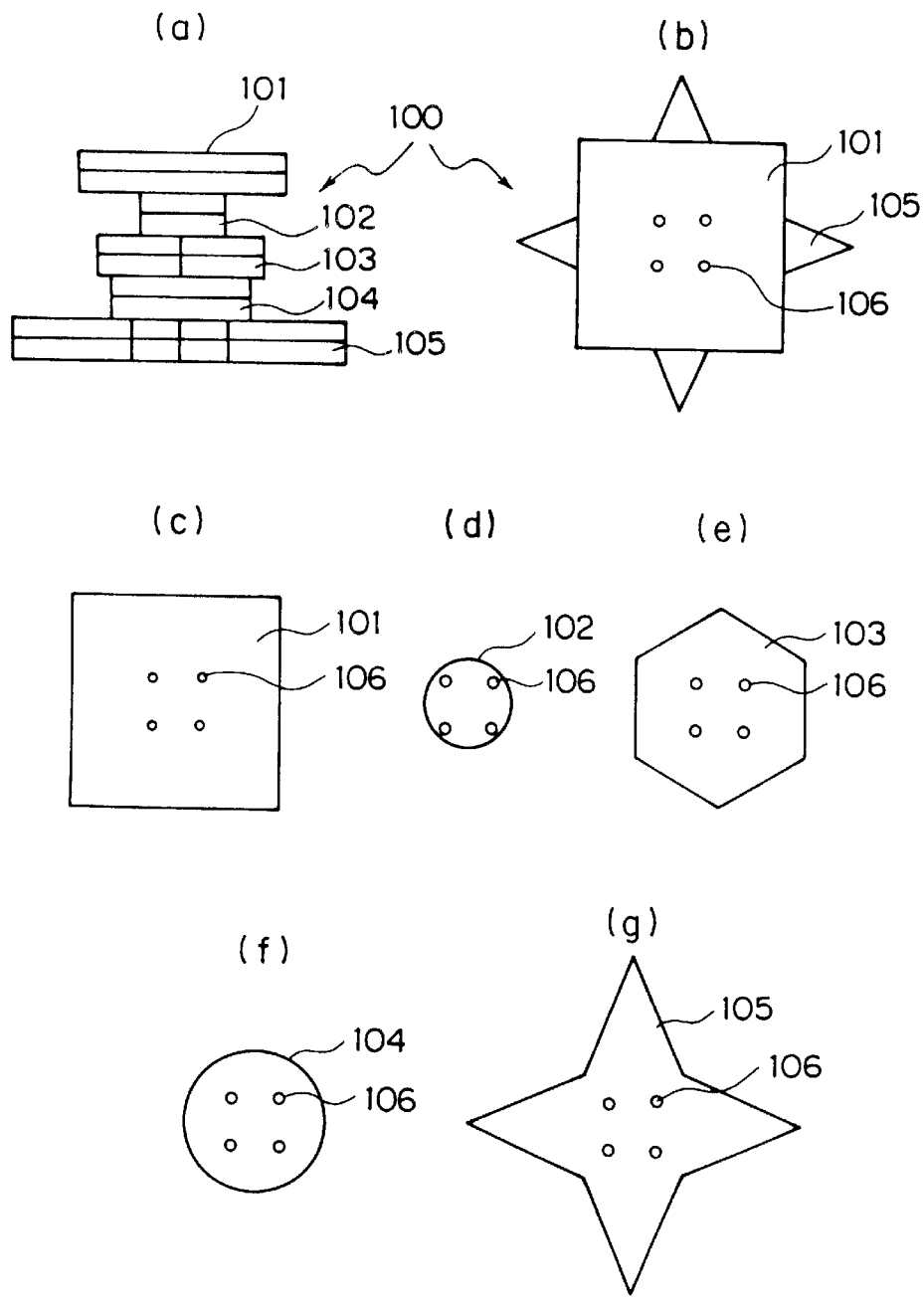
FIGS. 3(a)–(g) are diagrams of assistance in explaining a profile and component members thereof in an embodiment of this invention; (a) and (b) being front and plan views of the profile, and (c) through (g) plan views of component members comprising the profile, respectively.
Figure 4:
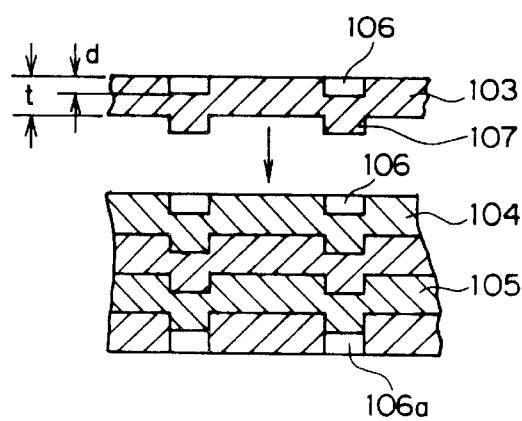
FIG. 4 is an enlarged longitudinal sectional view illustrating an essential part of component members laminated in an embodiment of this invention.

FIG. 4 is an enlarged longitudinal sectional view illustrating an example of laminating component members in an embodiment of this invention. Like parts are indicated by like reference numerals shown in FIG. 3. In FIG. 4, numeral 107 refers to a dowel formed coaxially with the dowel hole 106. The dowel hole 106 and the dowel 107 can be formed by using a punch and a die having a circular cross-sectional shape, for example, and making the penetration depth d of the punch into the die smaller than the thickness t of the component members 103~105 (the same applies to the component members 101 and 102 in FIG. 3). The dowel hole 106 and the dowel 107 may be formed simultaneously with the blanking of the component members 101~105 in FIG. 3 from steel sheets using a punch/die set, or in a separate process from the blanking of the component members 101~105. The cross-sectional shape of the dowel hole 106 and the dowel 107 may be any geometrical shape other than the circular shape as described above.

The component members 101~105 formed in the aforementioned manner can be sequentially laminated into a laminate by pressure bonding the adjoining component members shown in FIG. 4 each other, with the dowels 107 engaged with the dowel holes 106. In this case, the dowel holes 106 and the dowel 107, which are provided in the same shape and size at the same relative positions in the center of the component members 101~105, serve as positioning means for laminating the component members into a laminate. Through holes 106a should preferably be provided on the lowermost layer of the component member 105, instead of the dowel 107. By sequentially laminating the component members 101~105, as described above, the profile shown in FIGS. 3(a) and (b) can be manufactured.

FIGS. 5(a) through (e) are diagrams of assistance in explaining another profile and component members thereof in an embodiment of this invention: (a) being a longitudinal sectional view of the profile, (b) through (e) plan views of component members comprising the profile. In FIG. 5, a profile 200 is formed by laminating component members 201~204 blanked from steel sheets, for example, using a punch/die set into a laminate, in the same manner as that shown in FIG. 3.

Figure 5:
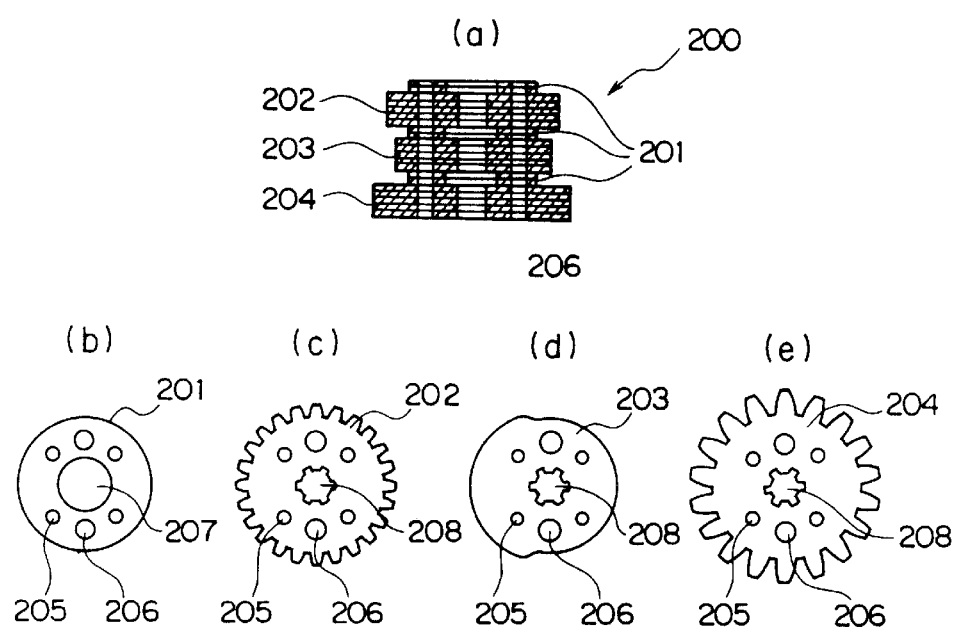
FIGS. 5(a)–(e) are diagrams of assistance in explaining another profile and component members thereof in an embodiment of this invention; (a) being a longitudinal sectional view of the profile, and (b) through (e) plan views of component members comprising the profile, respectively.

In FIG. 5, numeral 205 refers to dowel holes provided on the upper surface of the component members 201~204, and the dowels (not shown) are provided coaxially with the dowel holes 205 on the lower surface of the component members 201~205, as in the case of that shown in FIG. 4. Numeral 206 refers to guide holes provided on the component members 201~205 to improve the positioning accuracy of the component members 201~205 by engaging with guide pins provided on the laminating device at the time of laminating and pressure bonding the component members. Numeral 207 refers to a round hole, and 208 to a spline hole, both provided in the center of the component members 202~204.

By sequentially laminating the component members 201~204 formed in the aforementioned manner into a laminate, as shown in FIG. 5(a), the profile 200 is formed. That is, a gear portion is formed by the component members 202 and 204, a cam portion by the component member 203 on the outer periphery thereof, and a spacer portion by the component member 201 on the upper surface, and between the cam portion and the gear portion. The positioning accuracy of the component members 201~204 is further improved by engaging the guide pins with the guide holes 206, in addition to the engagement of the dowels (not shown) with the dowel holes 205. As a result, the outer surfaces of the cam and gear portions are accurately aligned with each other. This leads to the highly accurate workmanship of the product, making the product fully achieve its functions.

Figure 6:
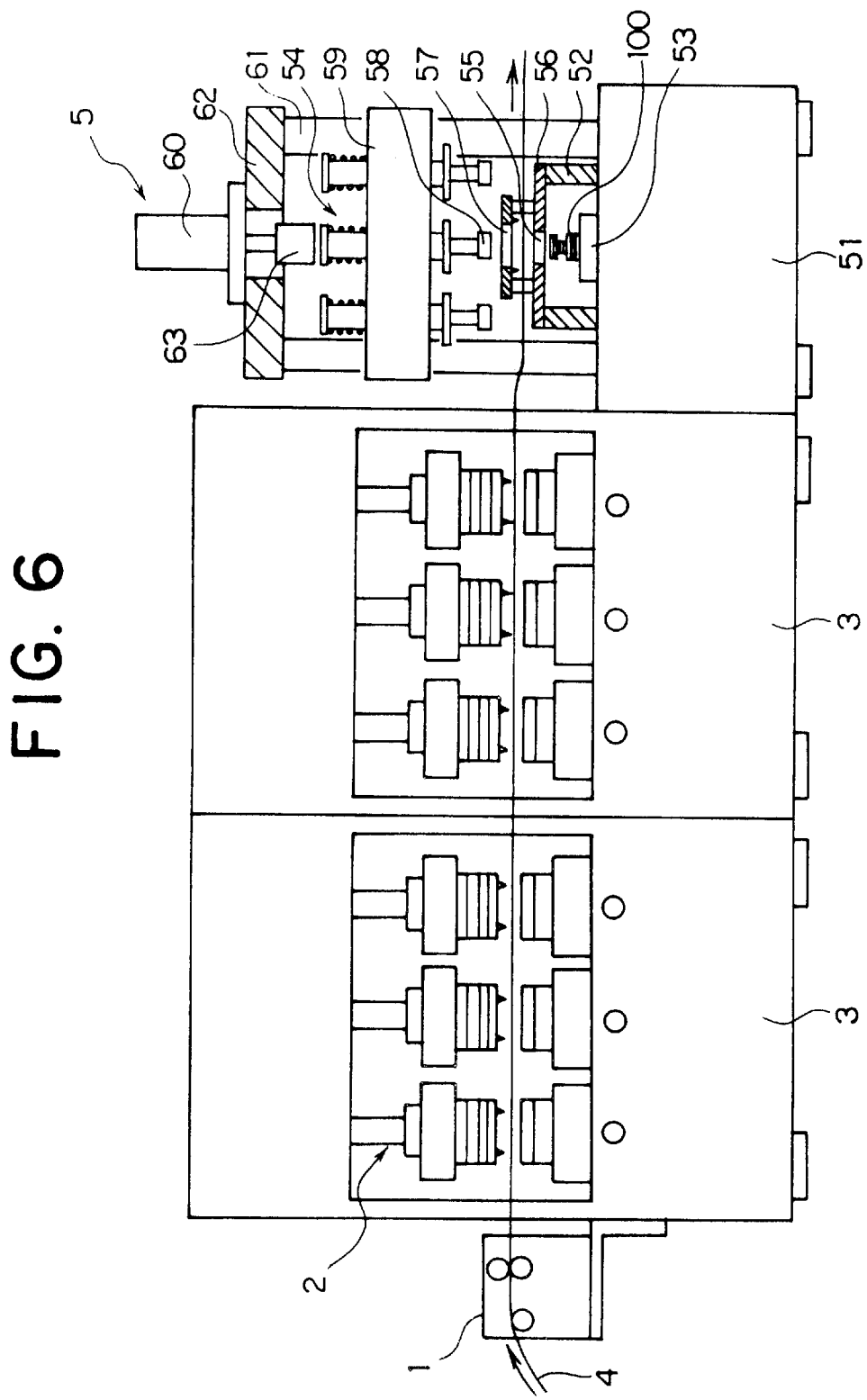
FIG. 6 is a front view of an embodiment of this invention.

FIG. 6 is a front view illustrating an embodiment of this invention. In FIG. 6, numeral 1 refers to a feeding device, 2 to a punch/die set, 5 to a laminating device: these three disposed in the workpiece feeding direction in that order. That is, the feeding device 1 is adapted to intermittently index the workpiece 4, wound in a hoop, in the longitudinal direction and disposed on the most upstream side in the workpiece feeding direction, for example. The feeding device 1, however, may be installed on the downstream side of the laminating device 5, or between the base machines 3 and 3, as will be described later.

The punch/die set 2 has such a construction as will be described later, and is disposed in the feeding direction of the workpiece 4 at intervals of mP (m is a given positive integer, and P is a feeding pitch of the workpiece 4). A plurality (three in FIG. 3) of the punch/die sets 2 are provided in the base machine 3, for example; each adapted to be selectively operable, with the position of each set adjustable in the workpiece feeding direction. Different types of the punch/die sets 2 are provided in accordance with the types of component members to be formed, as shown in FIGS. 3 and 5. In this case, an appropriate number of the base machines 3 having a plurality of the punch/die sets 2 are connected in tandem in the feeding direction of the workpiece 4.

The laminating device 5 is provided on the most downstream side in the workpiece feeding direction at intervals of nP (n is a given positive integer) with the punch/die set 2, and comprises a base 51, a holding device 52, a supporting device 53 and a pressure bonding device 54. A holding plate 56 having a hole 55 for restricting the downward movement of the workpiece 4 and allowing the component members (not shown. Refer to numerals 101~105 in FIG. 3.) to pass, and a guide member 57 formed in such a manner as to press and release the workpiece 4 are provided on the holding device 52. The supporting device 53 provided below the holding device 52 is adapted so as to carry the component members and the profile 100 thereon.

Furthermore, on the pressure bonding device 54 installed above the holding device 52 provided is a pressure bonding punch 58 that is vertically movable so as to eject component members from the workpiece 4, laminate and pressure bond them. A plurality of the pressure bonding punches 58 having outer contours similar or corresponding to the outer contours of the component members are prepared and attached to a holder 59 so that a specific pressure bonding punch 58 is selectively caused to move immediately above the workpiece 4 as the holder 59 rotates around the vertical shaft of the holder 59, for example. Numeral 60 refers to an actuating device comprising a hydraulic cylinder, for example, that is constructed so that an actuating member 63 is forced onto and released from the pressure bonding punch 58 via columns 61 provided upright on the base 51, and a supporting plate 62 placed on the columns 61.

Figure 7:
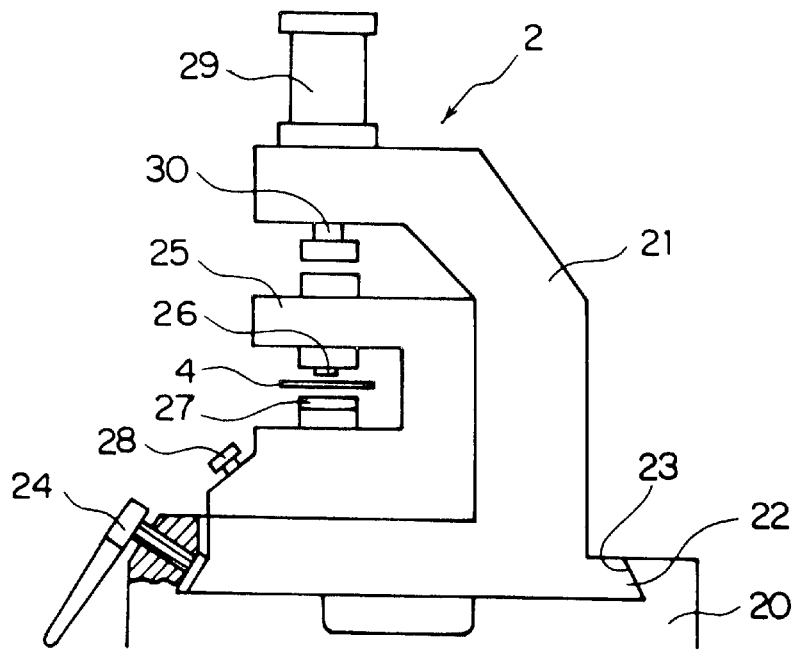
FIG. 7 is a side view illustrating an example of punch/die set 2 in FIG. 6.

FIG. 7 is a side view illustrating an example of the punch/die set 2 shown in FIG. 6. In FIG. 7, numeral 21 refers to a punch/die set proper formed of a steel material, for example, into substantially a U shape, with a dovetail 22 integrally fitted to the lower end thereof. The dovetail 22 is adapted to engage with a dovetail groove 23 provided on the base 20 so that the punch/die set proper 21 can be moved in the workpiece feeding direction (in the direction vertical to the paper surface), while the movement of punch/die set 2 in the direction vertical to the workpiece feeding direction, that is, in the horizontal direction in FIG. 7, is restricted. Upon completion of positioning, the punch/die set proper 21 is locked on the base 20 by a clamp device 24. The punch/die set 2 may comprise a gate-type punch/die set proper having upper and lower molds connected together with four guide bars.

Next, numeral 25 refers to a cassette formed of a steel material, for example, into a substantially U shape, with a punch 26 vertically movably provided on the upper part thereof and a die forming a pair with the punch 26 provided on the lower part thereof. The cassette 25 is detachably provided on the punch/die set proper 21. Numeral 28 refers to a clamp screw for locking the cassette 25 onto the punch/die set proper 21. Numeral 29 refers to a hydraulic cylinder provided on the upper end of the punch/die set proper 21 and adapted to actuate the punch 26 via an actuating lever 30.

Figure 8:
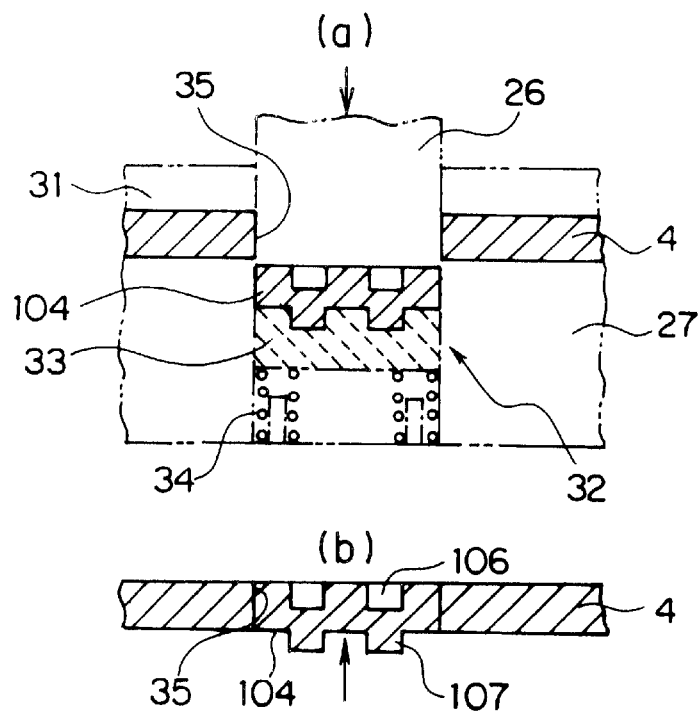
FIGS. 8(a) and (b) are enlarged longitudinal sectional views illustrating an example of push-back device in an embodiment of this invention; (a) showing the state where a component member is blanked, and (b) the state where the component member is pushed back to the original position.

FIGS. 8(a) and (b) are enlarged longitudinal sectional views illustrating a push-back device in an embodiment of this invention; (a) showing the state where a component member is blanked, and (b) showing the state where the component member is pushed back to the workpiece 4. Like parts are indicated by like numerals used in FIGS. 4 and 7. The component member is indicated by numeral 104. In FIG. 8, numeral 31 refers to a stripper for forcing the workpiece 4 in position on the surface of the die 27 before and after the actuation of the punch 26. Numeral 32 refers to a push-back device provided in the die 27, comprising a receiving member 33 and a compressed coil spring 34 for forcing the receiving member 33 upward. As a means for forcing the receiving member 33 upward may be a hydraulic cylinder and any other drive means.

With the aforementioned construction, when the punch 26 is lowered in the state where the workpiece 4 is forced on the upper surface of the die 27 by the stripper 31, as shown in FIG. 8(a), the component member 104 is blanked and held in position by the receiving member 33. Since the stripper 31 keeps forcing the workpiece 4 onto the die 27 even after the punch 26 has been lifted, the component member 104 is pushed back and replaced into a punched hole 35 on the workpiece 4 via the receiving member 33 by the upward pressure of the compressed coil spring 34. As a result, the component member 104 can be transported, together with the workpiece 4, to the final stage as the workpiece 4 is subsequently indexed.

Figure 9:
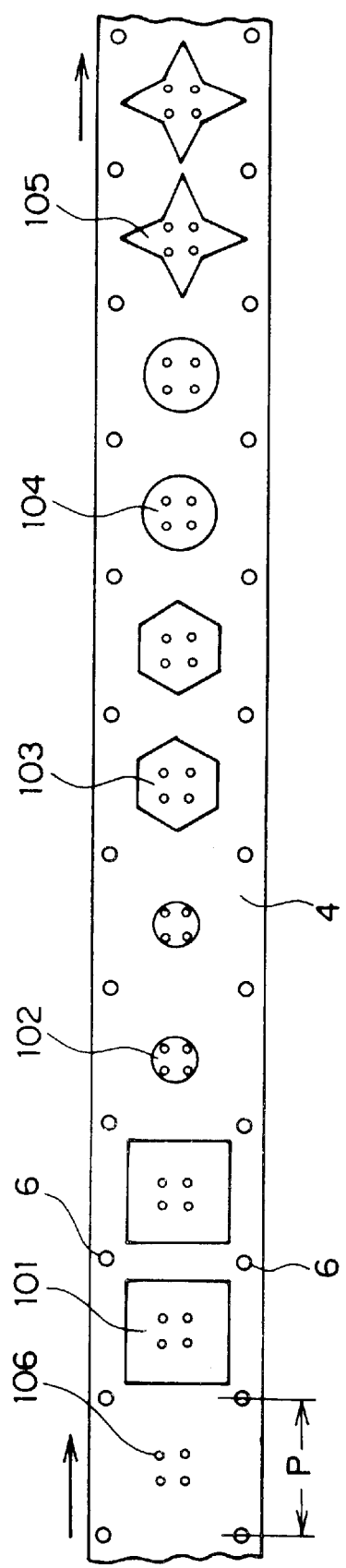
FIGS. 9 through 11 are plan views illustrating the state of the workpiece in first through third processing steps embodying this invention.

FIG. 9 is a plan view illustrating the first processing step embodying this invention. The figure shows the state where component members 101~105 are processed to manufacture the profile 100 shown in FIG. 3. In FIG. 9, the workpiece 4 is intermittently indexed by the feeding device 1 shown in FIG. 6 at predetermined intervals of P in the direction shown by an arrow. Numeral 6 refers to a pilot hole formed at intervals of P on the workpiece 4 by the punch/die set 2, shown in FIG. 6. located on the most upstream side. The pilot holes 6 serve as reference holes for positioning in the subsequent processing steps.

Next, dowel holes 106 are provided with a similar punch/die set 2, and dowels (not shown. Refer to numeral 107 in FIG. 4.) are provided coaxially with the dowel holes 106. In this case, pilot pins engaging with the pilot holes 6 are provided on the punch/die set 2 so that processing can be carried out by positioning the punch/die set 2 using the pilot holes 6 as reference holes. (The same applies to the punch/die sets used in the subsequent steps.)

The component members 101~105 are sequentially blanked and pushed back and replaced to the original punched holes on the workpiece 4 while indexing the workpiece 4 at intervals of P. In this case, five types of the punch/die sets 2 shown in FIG. 6 corresponding to the outer contours of the component members 101~105 are disposed so that these punch/(die sets 2 can be selectively actuated. Two pieces each, for example, of the component members 101~105 corresponding to the profile 100 shown in FIG. 3 are formed sequentially, as shown in FIG. 9. The component members 101~105 thus blanked are pushed back into the punched holes 35 on the workpiece 4, and transported, together with the workpiece 4, to the final stage.

The component members 101~105 pushed back and replaced to the workpiece 4 in the aforementioned manner are transported to the laminating device 5 provided in the final stage in FIG. 6, and sequentially laminated in the order of the component members 105~101 to form the profile 100. That is, the actuating device 60 is operated in the state where as the guide member 57 is lowered, and positioning is carried out by engaging the pilot pins on the punch/die set 2 with the pilot holes on the workpiece 4. The component members 101~105 are thus sequentially ejected, or pushed out of the workpiece 4 via the actuating member 63 and the pressure bonding punch 58 and placed on the supporting device 53.

In this case, the component members 101~105 are laminated as they are guided by the punched hole 35 (refer to FIG. 8) which serves as a die. The adjoining component members can be laminated integrally as the dowels 107 are engaged with the dowel holes 106, as shown in FIG. 4. The hole 55 provided on the holding plate 56 on the holding device 52 is formed into a size larger than the maximum outer contour of the component members 101~105 so that any of the component members 101~105 can be passed through the hole 55 without hindrance. The supporting device 53 for supporting the component members 101~105 should preferably be designed so that when the component members 101~105 are laminated and pressure bonded by the pressure bonding punch 58, the supporting device 53 is lowered by an amount equal to the thickness of the component members 101~105 and stopped at that position. After the profile 100 shown in FIG. 3 has been formed in the aforementioned manner, the profile 100 is discharged from the supporting device 53, and the next laminating and pressure bonding sequence is repeated.

Figure 10:
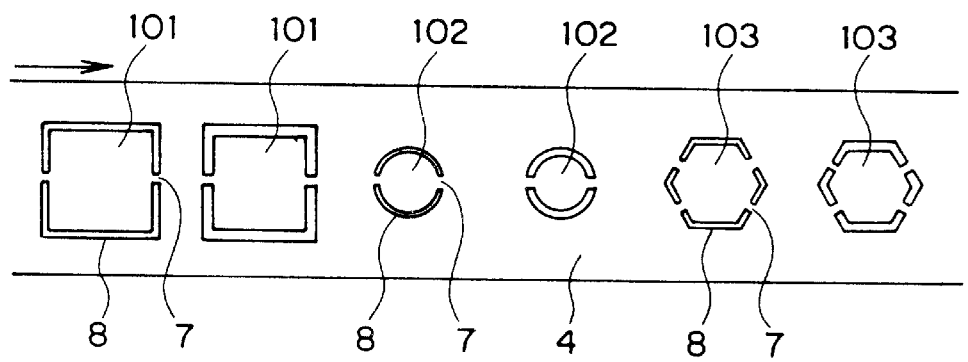

FIG. 10 is a plan view illustrating the second processing step embodying this invention. Like parts are indicated by like reference numerals used in FIG. 9. In FIG. 10, the pilot holes 6 and dowel holes 106 shown in FIG. 9 are omitted for the sake of simplicity. In FIG. 10, numeral 7 refers to a connecting part formed in a small width on part of the outer contour of a component member 101, for example to connect the workpiece 4 and the component member 101. That is, a slit-shaped punched part 8 is formed by the punch/die set.

The workpiece 4 is then indexed in the direction shown by an arrow, and the area of the workpiece 4 except for the connecting part 7 thereof is shaved by the next punch/die set. That is, the outer contour of a component member is removed by a slight amount, such as 0.1 mm, using a punch/die set having virtually no clearance between the punch and the die. In general, the sheared edge of a blanked workpiece has irregular shapes peculiar to shearing work, including a sheared surface, a fracture surface, round edges, or burrs. By subjecting to shaving operation, the sheared edge is finished into a smooth surface. Although the connecting parts 7 are fractured as the component member 101 is forced out of the workpiece 4 in the final stage, problems involving the fracture can be eliminated by providing the connecting parts 7 at locations where the state of surface causes no problems. The aforementioned shaving operation can be applied to other component members 102 and 103.

Figure 11:
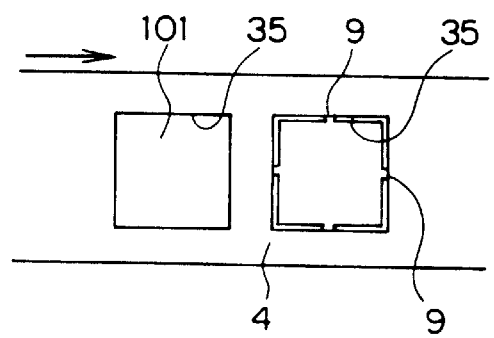

FIG. 11 is a plan view illustrating the third processing step embodying this invention. Like part are indicated by like numerals used in FIG. 10. In FIG. 11, a component member 101, for example, is blanked, pushed back and replaced to the original punched hole 35 in the same manner as the first processing step (refer to FIGS. 8 and 9). The component member 101 is then shaved with the next punch/die set excluding the non-shaving parts 9, pushed back and replaced to the punched hole 35, and retained on the workpiece 4 via non-shaving parts 9. Non-shaving parts 9 should preferably be provided at least at two selected locations where surface condition is not a prime consideration.

Figure 12:
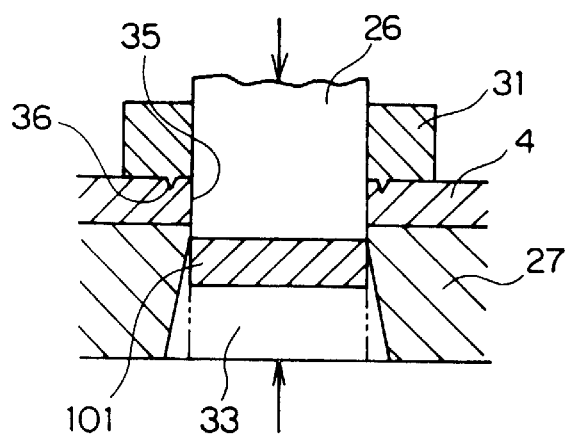
FIG. 12 is an enlarged longitudinal sectional view illustrating the workpiece in fourth processing step embodying this invention.

FIG. 12 is a longitudinal sectional view illustrating the fourth processing step embodying this invention. Like parts are indicated by like numerals used in FIG. 8. In FIG. 12, numeral 36 refers to an inverted-V-shaped ridge provided on the stripper 31 along the punched hole 35. In the Figure, a component member 101 is shown as an example, but the same applied to other component members. In FIG. 12, there is virtually no clearance between the punch 26 and the die 27 (fine blanking).

With the aforementioned arrangement, a component member 101 having no rounded edges or burrs on the outer periphery thereof can be blanked by lowering the punch 26, with the stripper 31brought into close contact with the workpiece 4 as the inverted-V-shaped ridge 36 provided on the stripper 31 cuts into the surface of the workpiece 4. After blanked out of the workpiece 4, the component member 101 is pushed back and replaced to the punched hole 35 as the receiving member 33 is pushed upward.

Figure 13:
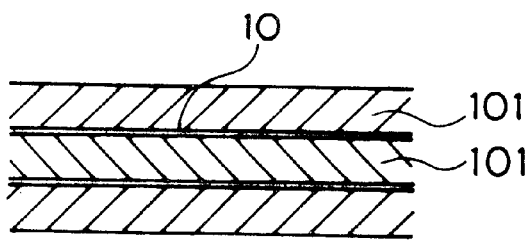
FIG. 13 is an enlarged longitudinal sectional view illustrating the state where component members of another example of workpiece are laminated in an embodiment of this invention.

FIG. 13 is an enlarged longitudinal sectional view showing the state where component members formed from another workpiece embodying this invention are laminated. In FIG. 13, numeral 10 refers to adhesive applied between the component members 101 and 101 to strongly bond the laminated component members 101. To achieve such a laminated state, it is sufficient to apply a 10~50-$\mu$m thickness of adhesive or deposit a heat bonding sheet material in advance on the surface of the workpiece.

Figure 14:
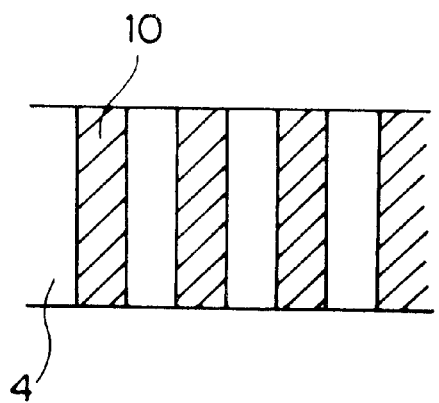
FIG. 14 is a plan view illustrating still another example of workpiece in an embodiment of this invention.

FIG. 14 is a plan view showing still another example of workpiece embodying this invention. In FIG. 14, shaded areas denote the adhesive applied in stripes or strips on the surface of the workpiece 4. When a profile 200 as shown in FIG. 5, for example, is formed using such a workpiece 4, small gaps are formed between the adhesives 10 and 10 applied in stripes or strips. Lubricant is penetrated or accumulated in these small gaps to feed the lubricant to the gear, cam or other portions of the profile 200. Deposition of a thin film containing lubricant such as carbon fine powder on the surface of the workpiece 4 would also be useful for lubricating the profile 200.

Figure 15:
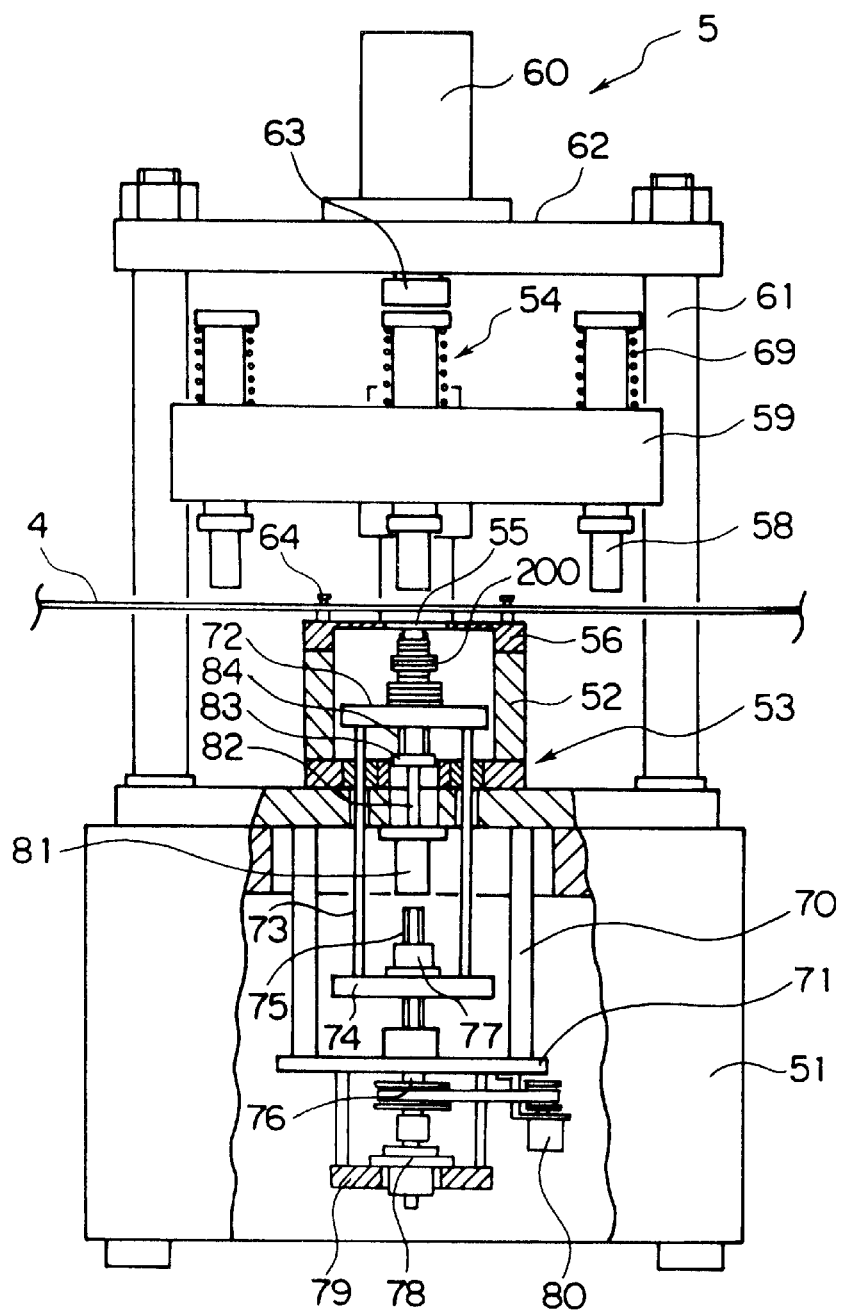
FIGS. 15 and 16 are partially sectional front and partially sectional side views illustrating another example of laminating device in an embodiment of this invention.
Figure 16:
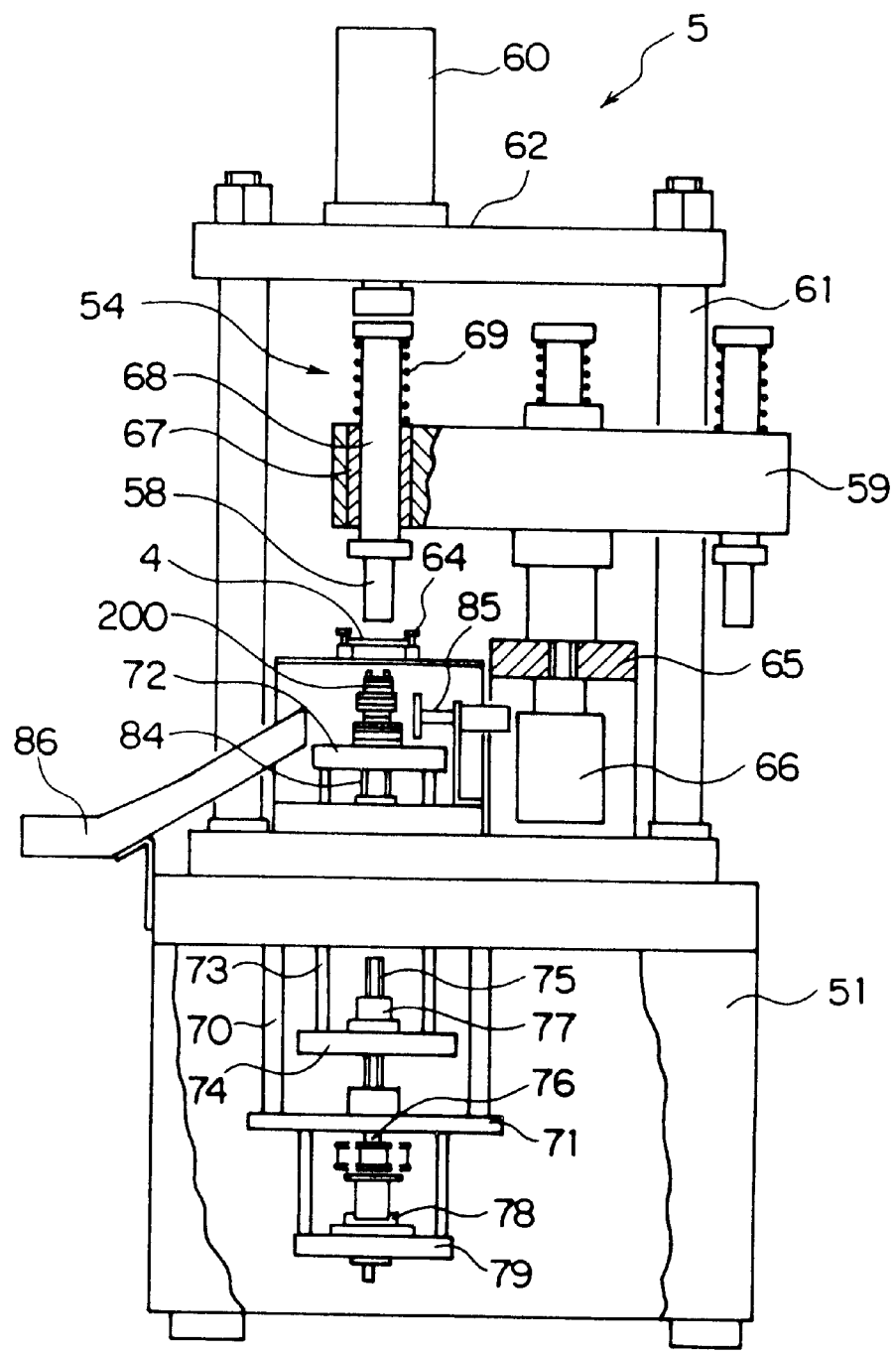

FIGS. 15 and 16 are partially sectional front and side views showing another example of laminating device embodying this invention. Like parts are indicated by like reference numerals used in FIG. 6. In FIGS. 15 and 16, a material guide 64 is vertically movably provided on the holding plate 56 in such a manner as to engage with the longitudinal edge of the workpiece 4 so that the workpiece 4 is allowed to move in the longitudinal direction but prevented to move in the direction orthogonally intersecting the feeding direction.

Next, numeral 65 refers to a holder support provided on the base 51 to support the holder 59 having a plurality of the pressure bonding devices 54 on the circumferential direction. The holder support 65 is adapted to cause the holder 59 to rotate around the vertical shaft to selectively place a predetermined pressure bonding punch 58 immediately above the workpiece 4. Numeral 66 refers to a drive motor provided on the holder support 65 and connected to the holder 59 so that the holder can be rotated selectively. The pressure bonding punch 58 constituting the pressure bonding device 54 is provided on the lower end of an actuating lever 68 that is vertically movably fitted to the holder 59 via a bush 67. Numeral 69 refers to a compression coil spring fitted to the actuating lever 68 so as to preload the actuating lever 68 to move upward.

The construction and operation of the supporting device 53 will be described in the following. The supporting device 53 is fitted to and supported by the base 51 by a supporting rod 70 and a supporting plate 71 provided on the base 51. Numeral 72 refers to a table supported by guide bars 73 passing through the base 51, and by a supporting shaft 76 provided upright on a guide plate 74 and the supporting plate 71 and having a male thread 75 on the upper end thereof. Numeral 77 is a female-thread member provided on the guide plate 74 to be enmeshed with the male thread 75. The male thread 75 and the female thread on the female-thread member 77 should preferably be multi-start threads so that a sufficient amount of lead can be achieved.

Numeral 78 refers to a brake device provided below the supporting plate 71 via a mounting member 79. The brake device 78 is adapted to engage with the lower end of the supporting shaft 76 so that the rotation of the supporting shaft 76 can be braked or released. Numeral 80 refers to a drive motor provided on the supporting plate 71 for causing the supporting shaft 76 to rotate in the normal or reverse direction.

Numeral 81 refers to a hydraulic cylinder provided on the base 51 for causing an actuating lever 82 to protrude upward. Guide pins 84 passing through the table 72 are vertically movably provided on the upper end of the actuating lever 82 via supporting member 83. Numerals 85 and 86 refer to a discharging device and a discharging chute, respectively, provided on the base 51 for discharging a profile 200, for example, after laminating and pressure bonding the component members thereof, from the table 72.

With the aforementioned construction, as the workpiece 4 from which the component members 101~105, for example, are blanked, pushed back and replaced to the punched holes, as shown in FIG. 91 by selectively operating a plurality of punch/die sets 2 shown in FIG. 6 is transported to the laminating device 5 shown in FIGS. 15 and 16, which is the final processing stage, the material guide 64 is lowered to press and hold the workpiece 4 in position on the holding plate 56.

A pressure bonding punch 58 suitable for ejecting a component member is brought immediately above the workpiece 4 by operating the drive motor 66. The component member is ejected from the workpiece 4 by operating the pressure bonding device 54 by the hydraulic cylinder 60, and then placed on the table 72 constituting the supporting device 53. In this case, the guide pins 84 that are protruded from the table 72 in advance by the operation of the hydraulic cylinder 81 are engaged with the guide holes 206 as shown in FIG. 5 provided on the component member to be ejected. As a result, the component members 201~204, for example, are placed in position on the table 72.

After the pressure bonding punch 58 is retracted upward, the workpiece 4 is indexed by one pitch, and the next component member is ejected from the workpiece 4 and placed on the preceding component member in the same manner as described above for lamination and pressure bonding. The adjoining component members are laminated and pressure bonded safely and tightly, as shown in FIG. 4 as the dowels 107 are engaged with the dowel holes 106 by the operation of the pressure bonding punch 58.

During the lamination and pressure bonding operations by the pressure bonding punch 58, the drive motor 80 is left in the inactive state, but the table 72 can be held at that position by bringing the brake device 78 into the braking state. As the pressing force exerted by the pressure bonding punch 58 when laminating and pressure bonding the component members causes the male thread 75 enmeshed with the female-thread member 77 to rotate via the female-thread member 77, the table 72 is lowered by the thickness of one component member, and stops at that position. In other words, the table 72 on which the aforementioned component members are placed can be repeatedly lowered and stopped sequentially by setting the pressing force exerted by the pressure bonding punch 58 larger than the braking force of the brake device 78. Thus, a profile 200 can be formed by laminating a predetermined number of component members into one unit.

After a profile 200 has been formed in the above-mentioned manner, the guide pins 84 are lowered below the table 72 by the operation of the hydraulic cylinder 81, and the discharging device 85 is operated to discharge the laminated and pressure bonded profile 200 through the discharging chute 86. After the profile 200 has been discharged from the table 72, the drive motor 80 is operated in the state where the brake device is released, causing the supporting shaft 76 to rotate to lift the table 72 to a position immediately below the holding plate 56, and the drive motor 80 is then stopped, with the brake device brought to the braked state, to secure the table 72 at that position. Next, the hydraulic cylinder 81 is operated to cause guide pins 84 to protrude on the table 72 to make the entire device ready for receiving the next component member, and the above-described operations are repeated.

Figure 17:
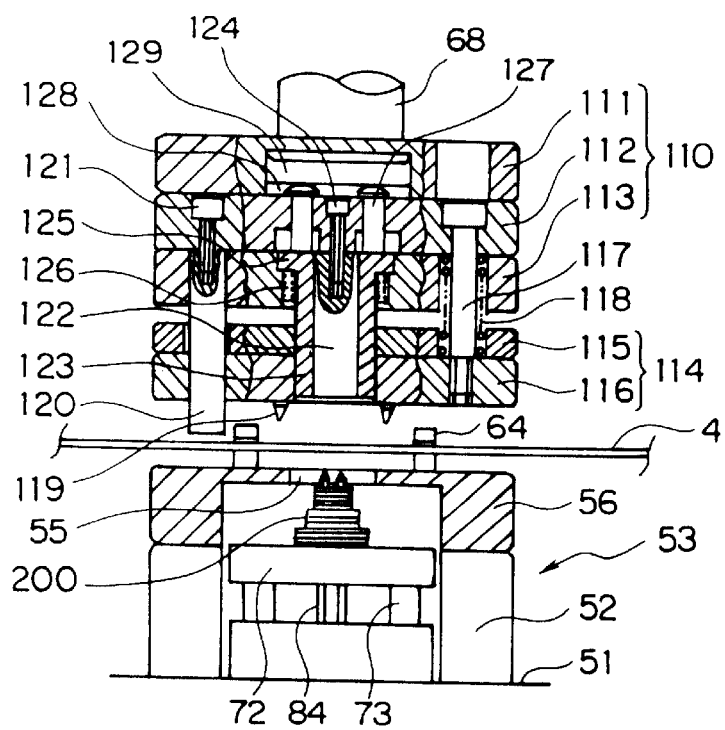
FIGS. 17 and 18 are cross-sectional and partially sectional side views illustrating another example of pressure bonding device in an embodiment of this invention.
Figure 18:
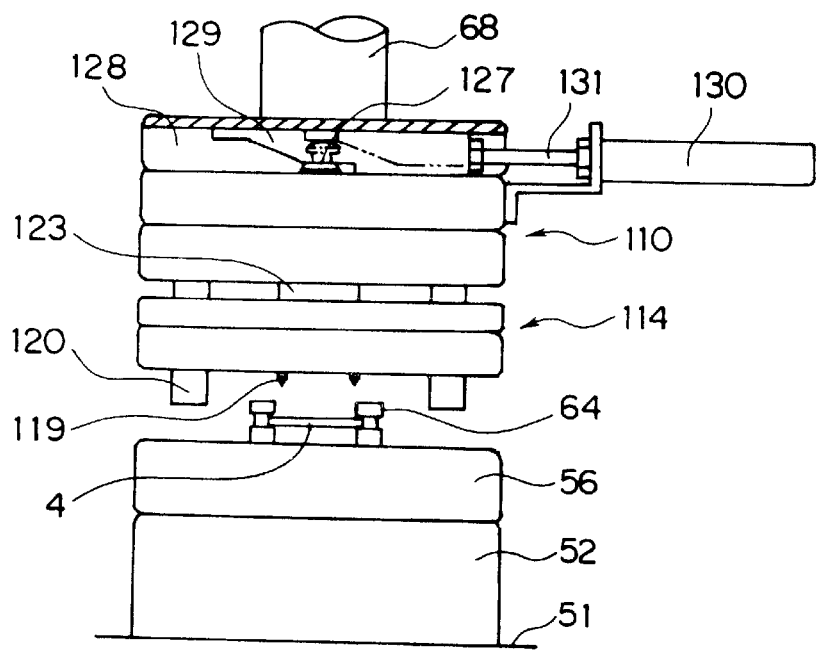

FIGS. 17 and 18 are cross-sectional and partially sectional side view showing another example of pressure bonding device embodying this invention. Like parts are indicated by like reference numerals used in FIGS. 15 and 16. In FIGS. 17 and 18, numeral 110 refers to a punch holder comprising an upper plate 111, middle plate 112 and lower plate 113, for example. These plates 111, 112 and 113 are laminated into a punch holder with a fastening means (not shown) and fixedly fitted to the lower end of the actuating lever 68.

Numeral 114 refers to a guide member formed by laminating an upper plate 115 and a lower plate 116 with a fastening means (not shown). The guide member 114 is connected to the punch holder 110 via a bolt 117, and a compression coil spring 118 is interposed between the middle plate 112 and the lower plate 116 so that the punch holder 110 can be connected to, and disconnected from the guide member 114. Numeral 119 refers to a pilot pin protruding downward on the guide member 114 to engage with the pilot hole 6 shown in FIG. 9 so that the workpiece 4 can be positioned. Numeral 120 refers to a guide pin provided on the punch holder 110 via a bolt 121, with the lower ends thereof passing through the guide member 114, in such a manner that the guide pin 120 can make sliding contact with the guide member 114.

Numerals 122 and 123 refer to inner and outer pressure bonding punches, each formed into a circular shape in cross section and adapted in a coaxially and vertically movable manner, and provided on the middle and lower plates 112 and 113 constituting the punch holder 110. That is, the inner pressure bonding punch 122 is fixedly fitted to the middle plate 112 via a bolt 124, and the outer pressure bonding punch 123 is fitted to the lower plate 113 via a flange 125 on the upper end thereof. Numeral 126 refers to a compression coil spring provided on the lower plate 113 to preload the outer pressure bonding punch 123 upward via the flange 125. Numeral 127 refers to an actuating pin embedded on the flange 125 of the outer pressure bonding punch 123; with the upper end thereof protruded into a cam chamber 128 provided on the upper plate 111.

Numeral 129 refers to a swash cam horizontally movably provided in the cam chamber 128 and adapted to make contact with the upper end of the actuating pin 127. Numeral 130 refers to an air cylinder connected to the swash cam 129 via an actuating lever 131. When the air cylinder 130 is operated to cause the outer pressure bonding punch 123 to move downward via the swash cam 129 and the actuating pin 127, the lower end surfaces of the inner pressure bonding and outer pressure bonding punches 122 and 123 are made flush with each other.

With the aforementioned construction, when the actuating lever 68 is lowered in the state where the outer pressure bonding punch 123 is lowered by operating the air cylinder 130 via the swash cam 129 and the actuating pin 127, that is, in the state where the lower end surfaces of the inner and outer pressure bonding punches 122 and 123 are made flush with each other, as shown in FIGS. 17 and 18, both the pressure bonding punches 122 and 123 collaborate to eject a component member (not shown) from the workpiece 4 for lamination and pressure bonding.

That is, as the actuating lever 68 is lowered, the pilot pin 119 provided on the guide member 114 engages with the pilot hole (not shown. Refer to numeral 6 in FIG. 9.) to position the component member that has been replaced on the workpiece 4. Next, the material guide 64 (preloaded upward by the compression coil spring (not shown)) is pushed down by the guide member 114, and the workpiece 4 is pressed and held between the holding plate 56 and the guide member 114. In this state, the component member is ejected from the workpiece 4 by the inner and outer pressure bonding punches 122 and 123, and placed on the table 72 via the guide pins 84.

Furthermore, when processing a component member of a smaller outer contour, the swash cam 129 is selectively moved to a position shown by a chain line in FIG. 18 by operating the air cylinder 130 in the opposite direction. Since this causes the outer pressure bonding punch 123 to be preloaded upward by the compression coil spring 126, the outer pressure bonding punch 123 does not come in contact with the workpiece 4, and only the inner pressure bonding punch 122 is operated by the lowering of the actuating lever 68 to eject the component member from the workpiece 4. Consequently, a component member 102, for example, of a smaller outer contour as shown in FIG. 9 can be smoothly ejected, laminated and pressure bonded.

When processing a component member 101 of a larger outer contour, on the other hand, component members can be ejected from the workpiece 4, laminated and pressure bonded smoothly and positively by causing both the inner and outer pressure bonding punches 122 and 123 to collaborate, as described above. That is, the inner and outer pressure bonding punches 122 and 123 can be selectively operated with a single pressure bonding device, in accordance with the outer contours of component members.

In the above embodiment shown in FIGS. 15 and 16, the holder 59 is adapted to be rotated around the vertical shaft. The holder 59, however, may be adapted to be moved horizontally. In short, a plurality of types of pressure bonding punches 58 provided on the holder 59 and formed into a plurality of cross-sectional outside dimensions smaller than the outer contours of component members connected to the workpiece 4 may be adapted to be selectively operated in accordance with the outer contours of component members.

In place of the hydraulic cylinder 81 and air cylinder 130 shown in FIGS. 15 and 18, other fluid pressure cylinders or other linear drive means may be used. Moreover, the cross-sectional shape of the inner and outer pressure bonding punches 122 and 123 shown in FIGS. 17 and 18 may be any shape, other than a circular shape, that can be selected appropriately, taking into account the outer contour of component members to be ejected from the workpiece 4 and laminated. In FIGS. 17 and 18, one unit of the outer pressure bonding punch 123 is shown, but a plurality of outer pressure bonding punches may be used so that they can be selectively operated in accordance with the outer contours of component members to be ejected.

Figure 19:
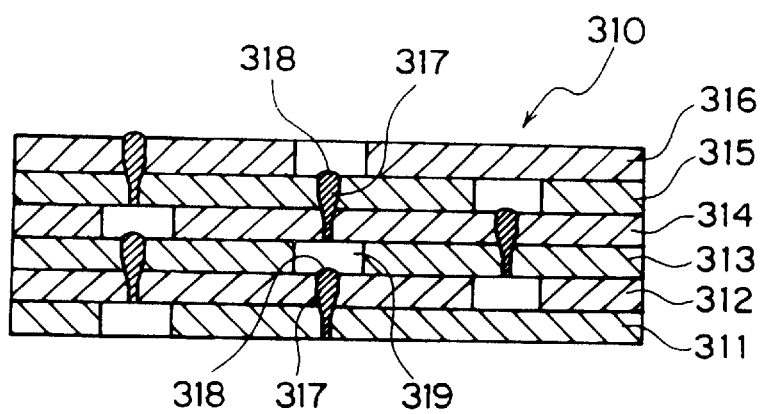
FIG. 19 is an enlarged longitudinal sectional view illustrating an example of laminate in an embodiment of this invention.

FIG. 19 is an enlarged longitudinal sectional view showing an example of laminate embodying this invention. In FIG. 19, the laminate 310 comprises six pieces of component members 311~316 made of steel sheets, for example, which are laminated sequentially from below, and sequentially integrated into a unit by applying laser beam from above. Numeral 317 refers to a weld, 318 to a buildup weld, and 319 to a clearance hole that is formed simultaneously with the press forming of the component members 311~316.

In FIG. 19, both the component members 311 and 312 are laminated and positioned, and then pressed in position with an appropriate means. A laser beam is then applied onto the component members 311 and 312 from above by a YAG ($Y_3Al_5O_{12}$;$Nd^{3+}$) laser to weld them together via a weld 317. As a result of this welding, a weld buildup 318 is formed on the upper end of the weld 317. Next, the component member 313 is laminated and welded together with the component members 311 and 312. At this time, the component member 313 is laminated and pressed in position by mating a clearance hole 319 on the component member 313 with the weld buildup 318 to clear the buildup 318, and then a laser beam is applied to weld the component member 313 to the component members 311 and 312 by forming another weld 317 at a location other than the clearance hole 319.

The component members 314~316 are sequentially laminated and welded to form a desired profile by repeating the above operations. Laser welding ensures accurate and positive lamination and welding of adjoining component members without causing gaps. Since the diameter of a weld buildup 318 is approximately 1.0 mm. for example, the diameter of the clearance hole 319 of about 2.0 mm may be sufficient to clear the buildup 318. Provision of clearance holes 319 would not affect the functions of the component members 311~316.

Figure 20:
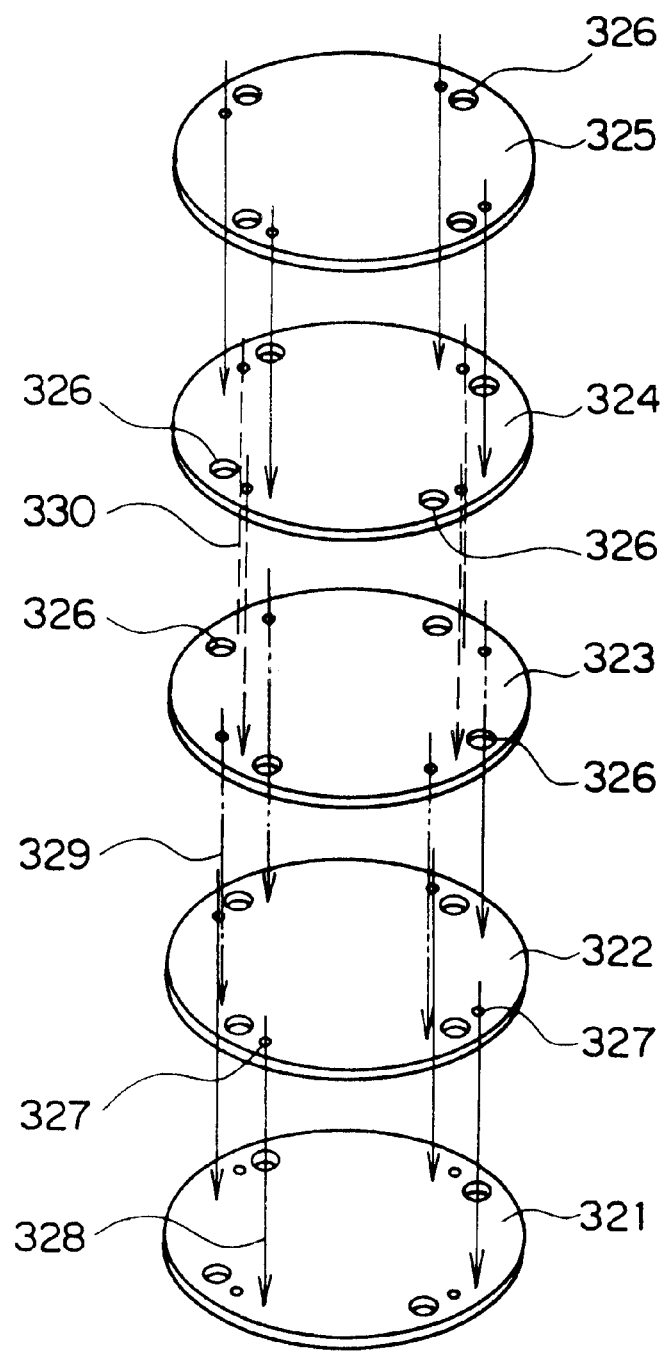
FIG. 20 is a perspective view illustrating the state where a weld buildup is cleared in an embodiment of this invention.

FIG. 20 is a perspective view showing a method of clearing a weld buildup in an embodiment of this invention. In FIG. 20, numerals 321~325 refer to component members punched from a steel sheet into a circular shape and having four clearance holes 326 near the circumference thereof. Numeral 327 refers to weld buildups formed on the same circumference as the clearance holes 326.

The component members 321 and 322 in FIG. 20 are laminated and positioned, pressed and held in position, and irradiated with a laser beam, as shown by a solid line, in the same manner as those shown in FIG. 19 to weld together into a profile. The next component member 323 to be laminated is laminated, with clearance holes 326 thereof mated with weld buildups 327 formed on the component member 322 immediately below the component member 323, and irradiated with a laser beam, as shown by a chain line, to weld together at locations other than the clearance holes 326 on the component member 323.

Still another component member 324 is also positioned so that clearance holes 326 thereon agree with the weld buildups 327 on the component member 323, and irradiated with a laser beam, as shown by a broken line, to weld together with the component member 323. In the same manner, a predetermined number of component members are laminated and welded together.

In the above embodiment, description has been made on component members of the same thickness. Component members, however, may be of different thicknesses. A plurality of component members may be welded together with a single welding operation. Furthermore, multiple types of component members having different outer contours and/or outside dimensions may be used.

Figure 21:
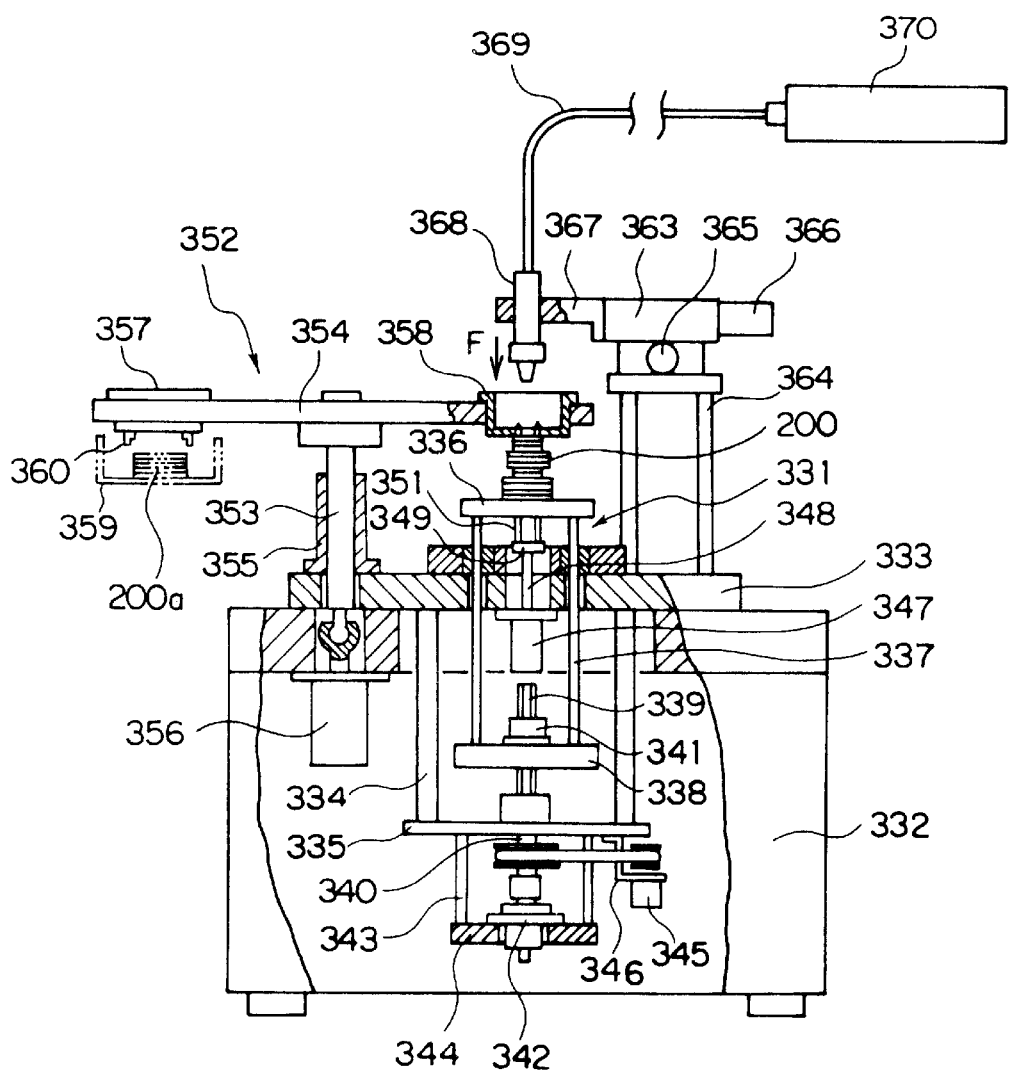
FIG. 21 is a partially cross-sectional front view illustrating an example of laminate manufacturing device in an embodiment of this invention.
Figure 22:
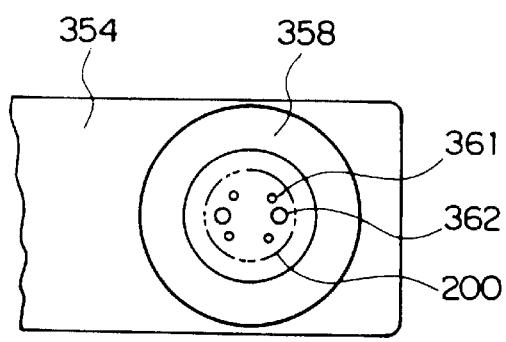
FIG. 22 is an enlarged view, viewed in the direction shown by arrow F, of FIG. 21.

FIG. 21 is a partially cross-sectional front view illustrating a laminate manufacturing device embodying this invention, and FIG. 22 is an enlarged view taken in the direction of the arrow F in FIG. 21. In FIGS. 21 and 22, numeral 331 refers to a supporting device supported on a base 332 by a supporting rod 334 and a supporting plate 335 via a base plate 333 provided on the base 332.

Numeral 336 is a table supported by guide bars 337 provided by passing through a base plate 333, and a supporting shaft 340 provided upright on a guide plate 338 and a supporting plate 335 and having a male thread 339 on the upper end thereof. Numeral 341 refers to a female-thread member provided integrally with the guide plate 338 and enmeshed with the male thread 339. The male thread 339 and the female thread of the female-thread member 341 should preferably be multi-start threads so that a sufficient amount of lead can be achieved.

Numeral 342 refers to a brake device provided below the supporting plate 335 via a mounting member 343 and a mounting plate 344. The brake device 342 is engaged with the lower end of the supporting shaft 340 so that the rotation of the supporting shaft 340 can be braked or released. Numeral 345 is a drive motor provided on the supporting plate 335 via a mounting member 346 and adapted so that the supporting shaft 340 can be rotated in regular or reversed direction.

Next, numeral 347 refers to a hydraulic cylinder provided on the base plate 333, with an actuating lever 348 protruded upward. On the upper end of the actuating lever 348 provided is a supporting member 349 so that guide pins 351 passing through the table 336 can be vertically moved.

Numeral 352 refers to a gripping and pressing device comprising a rotating shaft 353 and an arm 354 and provided in the vicinity of the supporting device 331. The rotating shaft 353 is rotatably and vertically movably supported within a supporting cylinder 355 formed into a hollow cylindrical shape, for example. The rotating shaft 353 is driven by a robot cylinder 356 connected to the lower end thereof.

A gripping member 357 and a pressing member 358 are provided on both ends of an arm 354 fixedly fitted to the upper end of the rotating shaft 353 so that the gripping member 357 and the pressing member 358 are brought above the a housing device 359 and a supporting device 331 by the rotation of the arm 354. That is, the gripping member 357 has claws 360 that are adapted to grip and release a component member 200a housed in the housing device 359. The pressing member 358 has through holes 361 allowing a laser beam to pass, and guide holes 362 for engaging with the guide pins 351.

Numeral 363 refers to an XY table provided on the base plate 333 via a supporting rack 364 adapted so as to move in the orthogonally intersecting XY directions by drive motors 365 and 366 via an NC control unit, for example. On the XY table 363 provided is a laser-beam unit 368 via a mounting member 367so that the laser-beam unit 368 can be brought above the table 336. A laser oscillator 370 is connected to the laser-beam unit 368 via a cable 369.

With the above construction, the method of manufacturing a laminate 200 as shown in FIG. 5 will be described in the following. The component members 201~204 as shown in FIG. 5, for example, are blanked with a known punch/die set, for example, and housed in a plurality of the housing devices 359 as shown in FIG. 21. The component members 201~204 have clearance holes corresponding to the clearance holes as shown in FIGS. 19 and 20, instead of dowel holes 205 and dowels that are provided coaxially therewith. In FIG. 21, component members are shown by numeral 200a.

The component members 200a may be housed in the housing device 359 either by temporarily stacking the component members 200a in advance in the order of lamination, or by providing guide pins corresponding to the aforementioned guide pins 351 in the housing device 359, positioning the component members 200a via the guide pins, and temporarily stacking them in the housing device 359.

In FIG. 21, after the table 336 has been lifted up to the uppermost position by operating the drive motor 345 to cause the supporting shaft 340 to rotate, the drive motor 345 is brought to an inoperative state and the brake device to the braking state to hold the table in that position. By operating the hydraulic cylinder 347, on the other hand, the guide pins 351 are caused to protrude upward on the table 336 by at least the thickness of component members 200a being laminated.

In the aforementioned state, the robot cylinder 356 is operated to cause the arm 354 to lower via the rotating shaft 353, and one piece, for example, of the component members 200a in the housing device 359 is gripped by the claws 360 of the gripping member 357. The arm 354 is then lifted by operating the robot cylinder 356, and turned 180° around the rotating shaft 353 to cause the component member 200a to move above the supporting device 331. The component member 200a is then placed on the table 336 by lowering the arm 354. In this case, since the component member 200a has guide holes 206 as shown in FIG. 5, the component member 200a is positioned on the table 336 as the guide holes 206 are engaged with the guide pins 351.

After the component member 200a has been placed on the table 336, the claws 360 release the component member 200a, the arm 354 is lifted again and turned 180° and lowered to the housing device 359 to grip the next component member 200a. After the second component member 200a has been positioned and placed on the preceding component member 200a in the same manner as above, the arm 354 is rotated and lowered to cause the gripping member 357 to move above the housing device 359, the pressing member 358 provided on the other end of the arm 354 presses and holds the component member 200a (indicated as a laminate 200 in FIG. 21) in position on the table 336, as shown in FIG. 21.

Next, the XY table 363 is operated to cause the laser-beam unit 368 to move so that a laser beam emitted from the laser-beam unit 368 impinges on the through holes 361 shown in FIG. 22, and the laser oscillator 370 is operated to emit a laser beam through the through holes 361 to weld the component members 200a together on the table 336. Other component members 200a are sequentially taken out of the housing device 359 in the same manner as above, held in position on the table 336, pressed and held in position via the pressing member 358, welded together by a laser beam to eventually form a laminate 200.

Figure 23:
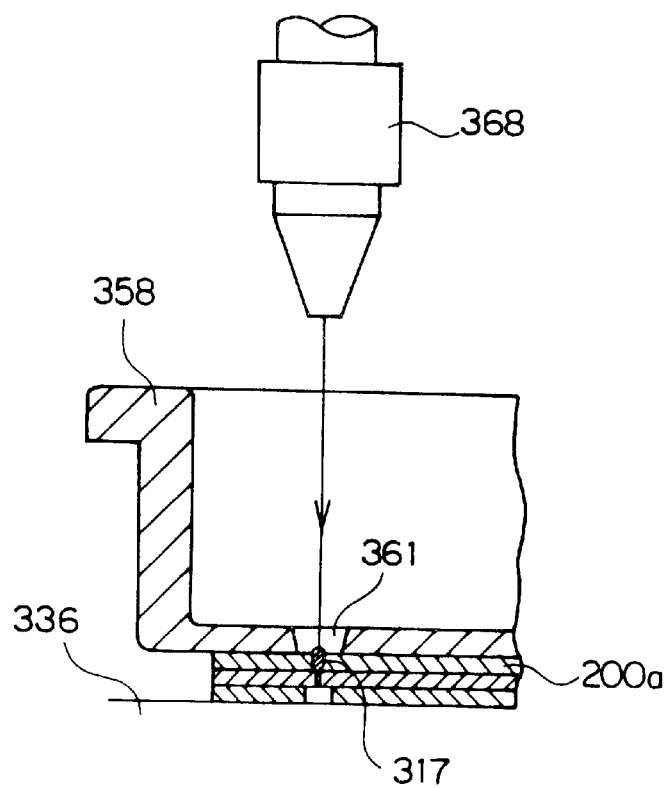
FIG. 23 is an enlarged longitudinal sectional view illustrating the state of laser welding in an embodiment of this invention.

FIG. 23 is a partially enlarged longitudinal sectional view illustrating the state of laser welding in an embodiment of this invention. Like parts are indicated by like reference numerals used in FIGS. 21 and 22. When the component members 200a on the table 336 are pressed and held in position by the pressing member 358, and irradiated with a laser beam from the laser-beam unit 368, the laser beam impinges on the component members 200a through the through holes 361 to form a weld 317, welding together the component members 200a. The inside dimensions of the through holes 361 should preferably be formed larger than the outside dimensions of the weld 317 to be formed.

Although the drive motor 345 is put into the inactive state during the lamination and the component members 200a in FIG. 21, the table 336 can be stopped at that position by bringing the brake device 342 to the operating state to ensure smooth and positive laser welding. The pressing force exerted by the pressing member 358 during the lamination of the component members 200a causes the female thread 341 and the male thread 339 enmeshed therewith to rotate. As a result, the table 336 is lowered by the thickness of one component member 200a and stopped at that position.

That is, the table 336 on which the component members 200a are placed can be sequentially lowered and lifted as described above by setting the pressing force exerted by the pressing member 358 (the force by the robot cylinder 356 to press downward) to a level larger than the braking force by the brake device 342. Thus, a laminate 200 can be smoothly and positively formed by laminating a predetermined number of component members 200a.

After a laminate 200 has been formed in the aforementioned manner, the guide pins 351 are lowered below the table 336 by operating the hydraulic cylinder 347 to discharge the laminate 200 by a discharging device (not shown). After the laminate 200 has been discharged from the table 336, the drive motor 345 is operated in the state where the brake device 342 is released to cause the supporting shaft 340 to rotate. As a result, the engagement of the male thread 339 with the female-thread member 341 causes the table to lift up to the original uppermost position, the drive motor 345 to stop, and the brake device to change to the braking state to hold the table 336 in position. Next, the hydraulic cylinder 347 is operated to cause the guide pins 351 to protrude on the table 336, bringing the table 336 to a state ready for receiving the next component member 200a. In subsequent steps, the aforementioned operations are repeated.

In sequentially laminating the component members 200a, it is essential to cause the weld 317 on the preceding component member to agree with the clearance hole 326 on the succeeding component member, as shown in FIG. 20. To this end, at least two types of clearance holes 326 having different relative positions should preferably be provided on the component members 201~204 shown in FIG. 5, for example, and the component members 201~204 should be temporarily stacked in advance in the housing device 359 shown in FIG. 21. Furthermore, multiple through holes 361 shown in FIG. 22 may be provided, or circular-arc-shaped through holes may be provided on the same circumference, for example.

In the above embodiments, description has been made on a case where component members are laminated one by one, but component members may of course be laminated by more than one component member in one laminating operation; the number of component members to be laminated may be determined in accordance with the power of laser beam from the laser oscillator 370. Furthermore, the hydraulic cylinder 347 and the robot cylinder 356 shown in FIG. 21 may be replaced with any other drive means that can vertically move the guide pins 351, and vertically move and rotate the arm 354. The arm 354 may be replaced with a turn table, on which a plurality of gripping members and pressing members may be provided on the same circumference.

INDUSTRIAL APPLICABILITY

This invention having the aforementioned construction and operation can accomplish the following effects.

1. Even a profile or laminate having a cross section that cannot be formed with normal machining operations can be easily manufactured.
2. Any change in the local specifications of a profile or laminate can be quickly coped with by changing part of component members. This lends itself to short production runs of products of wide variety
3. Even by laminating sheet materials, a laminate having high functions can be manufactured because of high bonding strength of each component member.
4. Since multiple types of component members can be manufactured through index-feed processing operations of a long-sized workpiece, highly efficient and low cost production is possible through integrated production starting from raw materials because of easy process control and parts control.
5. Since multiple types of component members can be selectively extracted and laminated, highly efficient and low cost production is possible.

What is claimed is:

1. A method for manufacturing profiles having different cross-sectional shapes in the height direction comprising the steps of, indexing a workpiece in the longitudinal direction, blanking a plurality of types of component members having outer contours corresponding to the cross-sectional shapes of a profile from said workpiece in a plurality of processing stages, pushing back and replacing said blanked component members into punched holes on said workpiece, sequentially ejecting said component members using said punched holes as guides, supporting said ejected component members from below, and laminating said component members into said profile by lowering said supported component members by an amount of the thickness of said component members and stopping said component members at that position every time said component members are laminated and pressure bonded in the final workpiece indexing stage.

2. A method for manufacturing profiles as set forth in claim 1 wherein part or whole of said component members are roughly blanked, and then pushed bark and replaced said blanked component members into punched holes on said workpiece, the remaining part of the outer contour of said component member is shaved, with a nonshaved portion left on part of the outer contour of said component member, said shaved component member is replaced into the punched hole on said workpiece.

3. A method for manufacturing profiles as set forth in claim 1 wherein part or whole of said component members are blanked, with virtually no gaps between a punch and die.

4. A method for manufacturing profiles as set forth in claim 1 wherein a plurality of guide holes passing through component members are formed so that component members are positioned by engaging guide pins with said guide holes in the final indexing stage.

5. A method for manufacturing profiles as set forth in claim 1 wherein a workpiece having adhesive applied on the surface thereof is used.

6. A method for manufacturing profiles as set forth in claim 5 herein adhesive is applied in stripes or strips.

7. A method for manufacturing profiles as set forth in claim 1 wherein a workpiece having an adhesive-containing thin film applied on the surface thereof is used.

8. A method for manufacturing profiles having different cross-sectional shapes in the height direction comprising the steps of, indexing a workpiece in the longitudinal direction, blanking part of a plurality of types of component members having outer contours corresponding to the cross-sectional shapes of a profile from said workpiece in a plurality of processing stages, pushing back and replacing said blanked component members into punched holes on said workpiece, slitting other part of said component members, with connecting parts to said workpiece left on part of said outer contours, shaving the outer circumference of said component members other than said connecting parts, sequentially ejecting said component members from said punched holes, and laminating said component members into said profile in the final workpiece indexing stage.

9. Apparatus for manufacturing profiles having different cross-sectional shapes in the height direction comprising a feeding device for intermittently indexing a workpiece in the longitudinal direction, a plurality of punch/die sets disposed in the workpiece feeding direction for forming a plurality of types of component members having outer contours corresponding to the cross-sectional shapes of a profile and adapted to be selectively operable, and a laminating device provided on the most downstream side of said punch/die sets in the workpiece feeding direction for sequentially ejecting said component members from said punched holes using punched holes as guides and laminating said component members into a profile; said laminating device comprising a holding device having a bole allowing a component member to pass through and adapted to restrict the downward movement of said workpiece, a pressure bonding device disposed above said holding device and having a vertically movable pressure bonding punch so as to eject component members from said workpiece and laminating and pressure bonding said component members, and a supporting device provided below said holding device and having a vertically movable supporting member that can hold said ejected component members thereon, said supporting member lowering said supported component members by an amount of a thickness of said component members and stopping said component members at that position every time said component members are laminated and pressure bonded in the final workpiece indexing stage:

a plurality of pressure bonding punches formed so as to have a plurality of cross-sectional sizes smaller than the outer contour of said component members are provided on a holder so that said pressure bonding punches can be selectively operated in accordance with the outer contours of said component members.

10. Apparatus for manufacturing profiles as set forth in claim 9 wherein said supporting member is adapted to lower by an amount of the thickness of said component members and stop at that position every time said component members are laminated and pressure bonded by said pressure bonding punch.

11. Apparatus for manufacturing profiles as set forth in claim 9, wherein said pressure bonding punches are provided on a rotatable holder having a vertical shaft in such a manner that the working centers of the pressure bonding punches are located at an equal distance from said vertical shaft.

12. Apparatus for manufacturing profiles as set forth in claim 9, wherein an inner pressure bonding punch and a plurality of hollow outer pressure bonding punches are provided coaxially, and the pressure bonding surfaces of said outer pressure bonding punches are retractably formed.

13. Apparatus for manufacturing profiles as set forth in claim 9 wherein a punch/die set for punching guide holes on component members and vertically movable guide pins that pass through said supporting member and protrude upward are provided: said guide holes being engaged with said guide pins to position said component members.

14. A method for manufacturing laminates by blanking from a sheet material component members having outer contours corresponding to the cross-sectional shapes of a laminate and sequentially laminating said component members into the laminate, comprising the steps of, providing a clearance hole passing through a component member when blanking said component member, laminating and welding together a plurality of component members by applying a laser beam, laminating and pressing the next component member being laminated on the previously laminated component members, with the clearance hole thereof mated with the weld buildup on the preceding component members, and welding together the next component member and the previously laminated component members by applying a laser beam onto locations other than said clearance hole on the component member.

15. A method for manufacturing laminates as set forth in claim 14 wherein a laminated profile having different cross-sectional shapes in the height direction is formed by a plurality of type of component members having different outer contours and/or outer dimensions.

16. A method for manufacturing laminates as set forth in claim 14 wherein component members are made of sheet materials having different thicknesses.

17. Apparatus for manufacturing laminates by blanking from a sheet material component members having outer contours corresponding to the cross-sectional shapes of a laminate and sequentially laminating said component members into the laminate, comprising a housing device for housing a plurality of types of component members having guide holes and clearance holes; said clearance holes provided in such a manner that the relative positions of said clearance holes with respect to said guide holes are different, a supporting device having a vertically movable supporting member that can hold said component members thereon and vertically movable guide pins passing through said supporting member and protruding upward for engaging with said guide holes, a gripping and pressing device having gripping members for extracting from said housing device and placing specific component members on said supporting device and a pressing member for pressing said component members placed on said supporting member, and a laser-beam unit for applying a laser bean from above onto said component members placed on said supporting member and adapted so that laser radiating position can be moved horizontally; when laminating a component member on a plurality of component members previously laminated, placed on said supporting member and welded together by operating said laser-beam unit, said gripping and pressing device and/or said housing device being adapted to selectively extract specific component members so that the clearance holes thereof are mated with the weld buildups on the previously laminated component members; and said laminated and pressed component members being welded together by operating said laser-beam unit.

18. Apparatus for manufacturing laminates as set forth in claim 17 wherein every time component members are welded together with said laser-beam unit, said supporting member is adapted to lower by an amount of the thickness of welded component members and stop at that position.

19. Apparatus for manufacturing laminates as set forth in claim 17 wherein said gripping and pressing device has a gripping member and a pressing member on both ends of a rotatable arm having a vertical shaft and is adapted to be vertically movable.

20. Apparatus for manufacturing laminates as set forth in claim 17 wherein a plurality of through holes that allow a laser beam from said laser-beam unit to pass through are provided on said pressing member.

21. A method for manufacturing laminated profiles, the method comprising the steps of:
feeding a workpiece in feeding direction through a plurality of stations;
punching a plurality of components out of the workpiece while creating a plurality of corresponding punched holes in the workpiece in a first of the stations;
replacing each of the plurality of components into their respective punched holes in the workpiece at the first station;
moving the workpiece with the components arranged in their respective punched holes away from the first station into a second station;
sequentially ejecting the plurality of components from the workpiece at the second station;
combining the ejected components at the second station into laminated profiles.

* * * * *